(12) United States Patent
Ito et al.

(10) Patent No.: US 11,375,659 B2
(45) Date of Patent: Jul. 5, 2022

(54) LAWNMOWER HAVING A BLADE WITH ADJUSTABLE FLAPS

(71) Applicant: HONDA MOTOR CO., LTD., Tokyo (JP)

(72) Inventors: Tomoki Ito, Wako (JP); Hideaki Kobayashi, Wako (JP); Koji Kuriyagawa, Wako (JP); Hajime Yoshimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 576 days.

(21) Appl. No.: 16/473,307

(22) PCT Filed: Dec. 26, 2017

(86) PCT No.: PCT/JP2017/046540
§ 371 (c)(1),
(2) Date: Jun. 25, 2019

(87) PCT Pub. No.: WO2018/124019
PCT Pub. Date: Jul. 5, 2018

(65) Prior Publication Data
US 2019/0335654 A1    Nov. 7, 2019

(30) Foreign Application Priority Data

Dec. 27, 2016    (JP) .............................. JP2016-253969

(51) Int. Cl.
*A01D 34/73*    (2006.01)
*A01D 34/76*    (2006.01)
*A01D 34/86*    (2006.01)

(52) U.S. Cl.
CPC .............. *A01D 34/73* (2013.01); *A01D 34/76* (2013.01); *A01D 34/733* (2013.01); *A01D 34/86* (2013.01)

(58) Field of Classification Search
CPC ....... A01D 34/73; A01D 34/733; A01D 34/86; A01D 2101/00; A01D 34/76; F16H 19/04
See application file for complete search history.

(56) References Cited

U.S. PATENT DOCUMENTS 3,389,541 A * 6/1968 Freedlander ........... A01D 34/73
                                                        56/295
3,742,688 A * 7/1973 Tonjes, Jr. .............. A01D 43/02
                                                        56/367

(Continued)

FOREIGN PATENT DOCUMENTS

JP          8-70667      3/1996
JP        2015-188337   11/2015

OTHER PUBLICATIONS

International Search Report, dated Mar. 13, 2018 (Mar. 13, 2018), 1 page.

*Primary Examiner* — Alicia Torres
*Assistant Examiner* — Matthew Ian Neal
(74) *Attorney, Agent, or Firm* — Rankin, Hill & Clark LLP (57) ABSTRACT

A lawn mower includes a cutter blade having flaps and a flap drive mechanism. The flap drive mechanism includes a flap drive source and an intermediate power transmission unit. The intermediate power transmission unit is provided on a power transmission path between the flap drive source and the flaps and provided coaxially with a blade rotation axis. An output axis of a motor is provided coaxially with a blade rotation axis and the intermediate power transmission unit.

12 Claims, 6 Drawing Sheets

(56) References Cited

U.S. PATENT DOCUMENTS

| | | | | |
|---|---|---|---|---|
| 4,306,407 | A * | 12/1981 | Dambroth | A01B 63/108 |
| | | | | 172/438 |
| 7,275,355 | B2 | 10/2007 | Adams et al. | |
| 9,307,695 | B2 * | 4/2016 | Nishihara | A01D 34/005 |
| 10,070,578 | B2 * | 9/2018 | Kuriyagawa | A01D 34/6806 |
| 10,070,580 | B2 * | 9/2018 | Kuriyagawa | A01D 34/73 |
| 10,070,581 | B2 * | 9/2018 | Kuriyagawa | A01D 34/6812 |
| 10,070,584 | B2 * | 9/2018 | Kuriyagawa | A01D 34/68 |
| 10,085,380 | B2 * | 10/2018 | Kuriyagawa | A01D 34/73 |
| 10,091,931 | B2 * | 10/2018 | Yoshimura | A01D 34/64 |
| 10,813,285 | B2 * | 10/2020 | Kuriyagawa | A01D 34/73 |
| 2004/0187463 | A1 * | 9/2004 | Eddy | A01D 34/73 |
| | | | | 56/295 |
| 2012/0198807 | A1 * | 8/2012 | Upham | A01D 34/73 |
| | | | | 56/289 |
| 2015/0271998 | A1 | 10/2015 | Kurioka et al. | |
| 2021/0289697 | A1 * | 9/2021 | Kurihara | A01D 34/826 |

* cited by examiner

LAWNMOWER HAVING A BLADE WITH ADJUSTABLE FLAPS

TECHNICAL FIELD

The present invention relates to a lawn mower (lawnmower) including a cutter blade having a flap with a flap angle being changeable.

BACKGROUND ART

A rotary lawn mower cuts (clips) grass on lawns by rotating a cutter blade accommodated in a housing having an opened bottom, along the grass. Such a lawn mower is, for example, disclosed in the specification of U.S. Pat. No. 7,275,355. According the specification of U.S. Pat. No. 7,275,355, the grass (clippings) cut by a cutter blade is swirled and lifted upward in a housing by an air lift unit and then stored in a clippings container. A motor for driving rotation of the cutter blade is provided coaxially with a blade rotation axis.

SUMMARY OF INVENTION

In this regard, in order to efficiently generate transportation wind (swirl wind) for swirling grass clippings in the housing and transporting the grass clippings into the grass clippings container, it may be considered to provide a flap having a changeable flap angle for the cutter blade. In this case, for the purpose of achieving a simple structure, it may be considered that a drive source for driving the flap is provided coaxially with the blade rotation axis, and a motor for driving rotation of the cutter blade is provided at a position away from the blade rotation axis in a front/rear direction.

However, when the motor having a heavy weight is provided at a position away from the blade rotation axis in the front/rear direction, a suitable balance of weight distribution is lost, and the lawn mower cannot be handled by the user easily. For example, in the case where the motor is provided at a position away from the blade rotation axis in the front direction, at the time of floating the front wheels above the ground to change the orientation of the lawn mower, the load required for depressing the control handle becomes large, and the user's burden becomes large. In contrast, in the case where the motor is provided at a position away from the blade rotation axis in the rear direction, at the time of operating the lawn mower in the slope area (uphill slope), the front wheels tend to float above the ground, and the user cannot operate the lawn mower accurately.

The present invention has been made taking the problems into account, and an object of the present invention is to provide a lawn mower in which it is possible to provide a flap mechanism in a cutter blade without losing a suitable weight distribution balance.

In order to achieve the above object, the present invention provides a lawn mower including a motor having an output axis, a cutter blade including a blade body that is rotatable about a blade rotation axis and a flap that has changeable flap angle and is attached to the blade body, and is driven by the motor, and a flap drive mechanism configured to drive the flap. The flap drive mechanism includes a flap drive source that generates power for driving the flap, and an intermediate power transmission unit provided on a power transmission path between the flap drive source and the flap and provided coaxially with the blade rotation axis. The output axis of the motor is provided coaxially with the blade rotation axis and the intermediate power transmission unit.

In the lawn mower of the present invention having the above structure, the motor which tends to have a heavy weight is provided coaxially with the blade rotation axis and the intermediate power transmission unit that is part of the flap drive mechanism. Therefore, in the lawn mower having the cutter blade equipped with the flap, it is possible to achieve the suitable balance of weight distribution. Therefore, it becomes possible to provide the flap mechanism for the cutter blade without using the suitable weight allocation balance. In this manner, it becomes possible to improve the performance of handling the lawn mower. For example, in the case of changing the orientation of the lawn mower, since the handling load is not increased, it is possible to reduce the burden on the user. Further, during the working operation in the slope area (uphill slope), it becomes possible to suppress floating of the front wheels above the road.

The intermediate power transmission unit may be a power steering unit that converts a rotational driving power from the flap drive source into axial power along the blade rotation axis.

In the structure, it is possible to adopt a rotary actuator as the flap drive source.

The power steering unit may have a hollow cylindrical body including a hollow part along the blade rotation axis, and the rotational driving power of the motor may be transmitted to the cutter blade through the hollow part of the power steering unit.

In this manner, it is possible to realize a structure where the output axis of the motor and the power steering unit are provided coaxially and the driving power for rotating the cutter blade and the driving power for operating the flap are transmitted separately and suitably.

The power steering unit may include a rotation cylinder and an axially movable body where driving power from the flap drive source is transmitted to the rotation cylinder and the rotation cylinder is provided in a rotatable manner about the blade rotation axis, and the axially movable body engages with the rotation cylinder in a displaceable manner along the blade rotation axis accompanied by rotation of the rotation cylinder.

In the structure, it is possible to convert the rotational driving power from the flap drive source into the axial power along the blade rotation axis.

The axially movable body may include a screw cylinder that screw-engages with the rotation cylinder in a non-rotatable manner with respect to a machine body of the lawn mower and a slide cylinder that is arranged in a rotatable manner with respect to the screw cylinder and is displaced together with the screw cylinder accompanied by displacement of the screw cylinder along the blade rotation axis.

In the structure, the slide cylinder is rotatable together with the output axis of the motor and the cutter blade, and the flap driving power can be transmitted to the flap provided in the rotating cutter blade suitably. In the structure, the slide cylinder is rotatable together with the output axis of the motor and the cutter blade, and the flap driving power can be transmitted to the flap provided in the rotating cutter blade suitably.

A unit holder that supports the screw cylinder in a displaceable manner along the blade rotation axis and in a relatively non-rotatable manner may be provided coaxially with the blade rotation axis and surrounds the screw cylinder, and blade holder that holds the cutter blade may be provided coaxially with the blade rotation axis, and the blade holder may be supported in a rotatable manner by the unit holder.

In this manner, since the unit holder has both of the function of supporting the screw cylinder in a displaceable manner in the axial direction and the function of supporting the blade holder in a rotatable manner, it is possible to simplify the structure.

The blade holder that holds the cutter blade may be provided coaxially with the blade rotation axis the blade holder may include a support cylinder extending coaxially with the blade rotation axis and the slide cylinder may be supported by the support cylinder in a relatively non-rotatable and relatively axially movable manner.

Accordingly, since the unit holder has both of the function of supporting the slide cylinder in a displaceable manner in the axial direction and the function of supporting the blade holder in a rotatable manner, it is possible to simplify the structure.

The blade holder that holds the cutter blade may be provided coaxially with the blade rotation axis, the blade holder may include a support cylinder extending coaxially with the blade rotation axis, and the rotation cylinder may be supported by the support cylinder in a rotatable manner.

Accordingly, since the unit holder has both of the function of supporting the rotation cylinder in a displaceable manner and the function of supporting the blade holder in a rotatable manner, it is possible to simplify the structure.

The intermediate power transmission unit may be supported by a unit holder attached to a machine body of the lawn mower.

In the structure, it is possible to suitably hold the intermediate power transmission unit.

The lawn mower may include a housing opened downward, and containing the cutter blade, the intermediate power transmission unit may include a driven rotating body where rotational driving power from the flap drive source is transmitted to the driven rotating body, the driven rotating body is rotatable about the blade rotation axis, and the driven rotating body is provided between the motor and the housing.

In the structure, since it is possible to avoid the situation where the blade accommodation chamber (transportation wind generation chamber) formed in the housing is restricted by the driven rotatable body.

The intermediate power transmission unit may include an axially movable body that is displaceable along the blade rotation axis and the flap drive mechanism may include a rack and pinion mechanism configured to convert an axial driving power of the axially movable body into a rotational driving power for operating the flap.

In the structure, the force of holding the position (angle) is exerted stably over the movable range of the flap, and only the minimum rattling occurs on the power transmission path between the axially movable body and the flap. Therefore, it is possible to generate the stable transportation wind without causing any bad influence on the lawn mowing performance.

The lawn mower may include a control handle extending backward from a machine body equipped with the motor and a battery that supplies electric power to the flap drive mechanism and the battery may be provided on a front side of the motor.

In the structure, since the weight of the control handle and the weight of the battery are offset, the center of the weight of the lawn mower can be positioned closer to the blade rotation axis. In this manner, it is possible to improve the balance of the weight distribution ideally.

In the lawn mower of the present invention, it becomes possible to provide the flap mechanism for the cutter blade without losing the suitable balance of weight distribution.

DESCRIPTION OF EMBODIMENTS

Hereinafter, a preferred embodiment of a lawn mower according to the present invention will be described with reference to the accompanying drawings.

Figure 1:
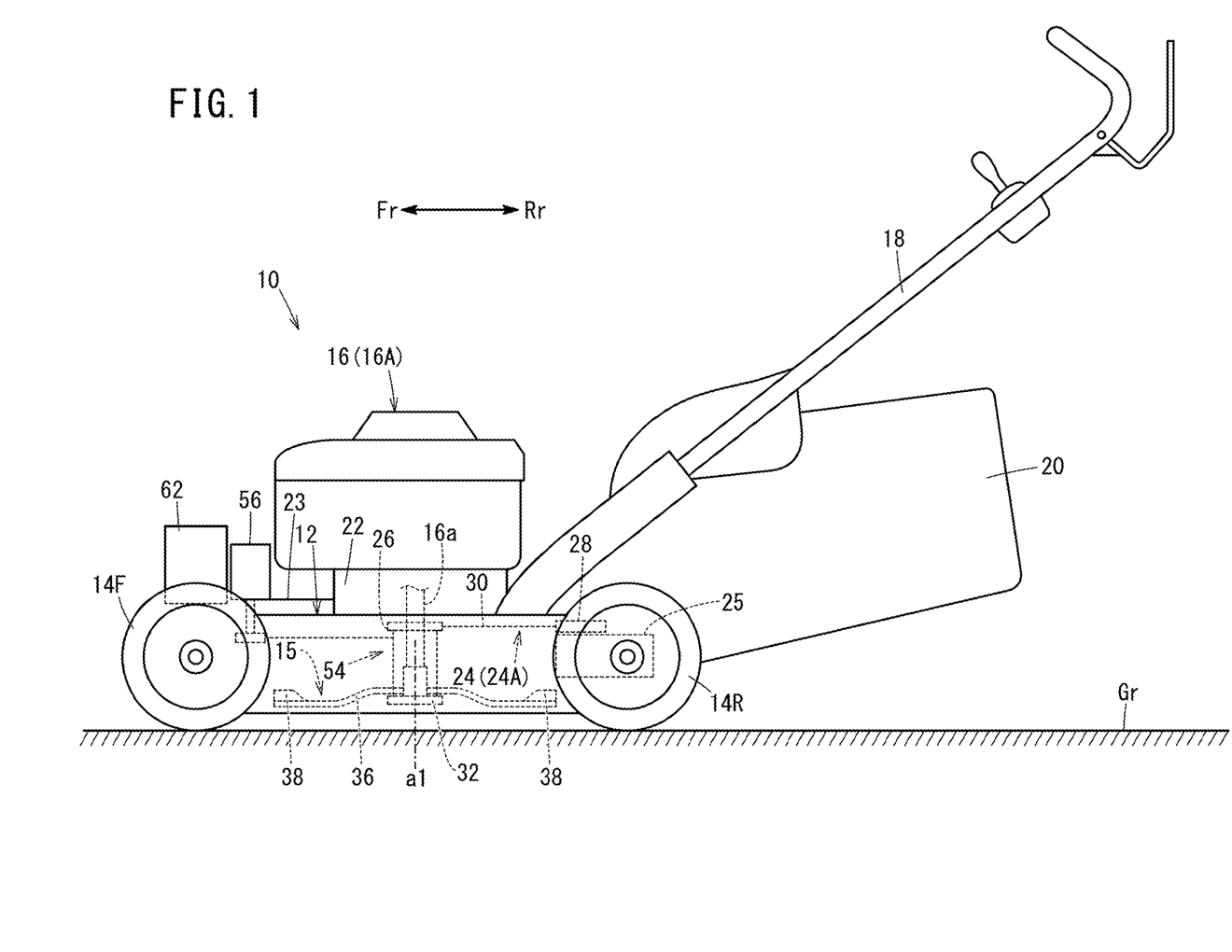
FIG. 1 is a side view showing a lawn mower according to an embodiment of the present invention.
Figure 2:
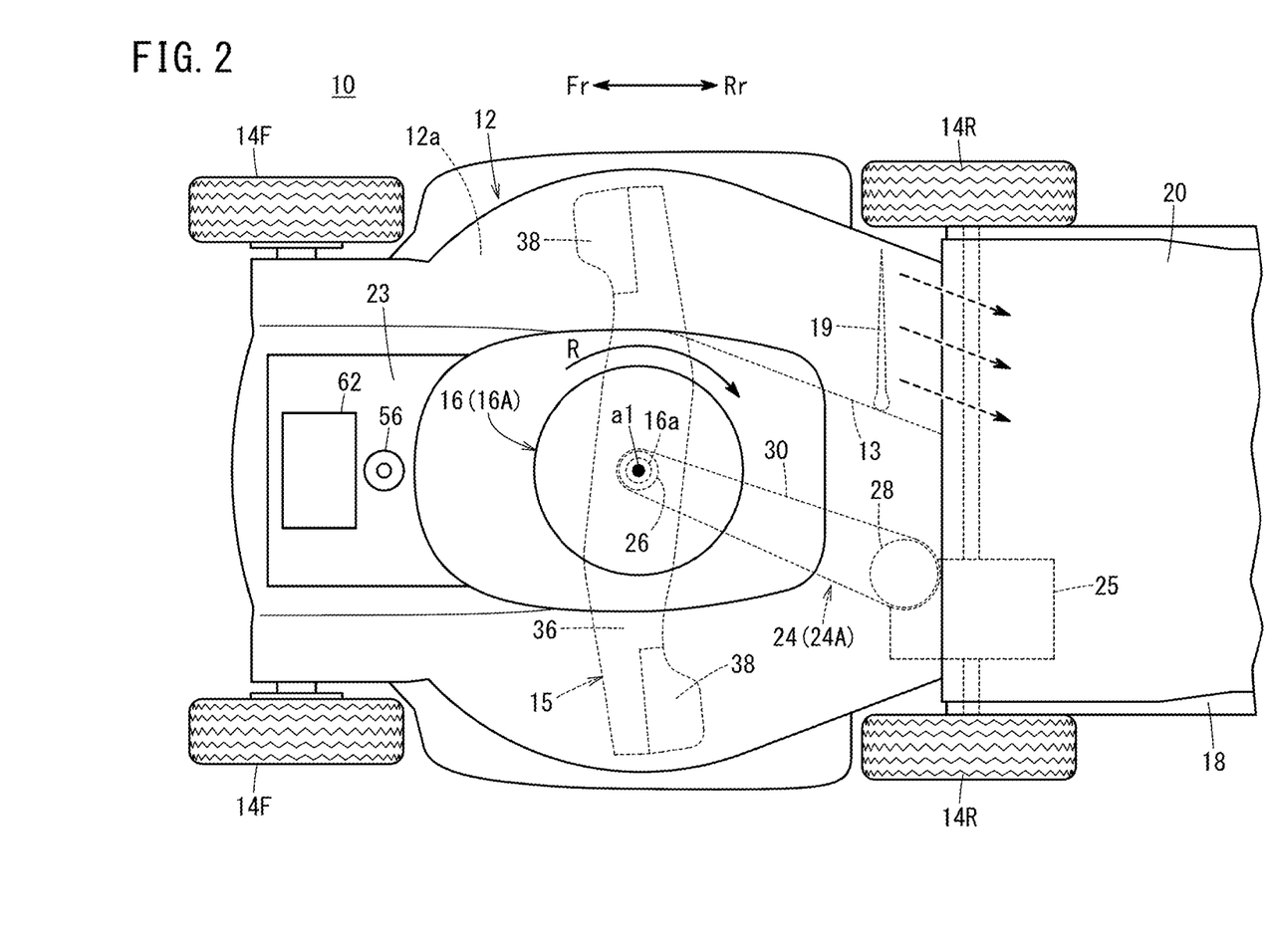
FIG. 2 is a plan view showing the lawn mower.

A lawn mower 10 shown in FIGS. 1 and 2 according to the present embodiment is a walk-behind, self-propelled working machine for cutting lawn grass. In FIGS. 1 and 2, an arrow Fr denotes the front side (same as the front side of a human operator) of the lawn mower 10, and an arrow Rr denotes the rear side (same as the rear side of the human operator) of the lawn mower 10.

The lawn mower 10 includes a housing 12 as a machine body, left and right front wheels 14F provided on the front side of the housing 12, left and right rear wheels 14R provided on the rear side of the housing 12, a cutter blade 15 accommodated inside the housing 12 for cutting grass on lawns, a motor 16 provided above the housing 12, and a control handle 18 extending backward from the housing 12.

As shown in FIG. 2, in a plan view, the lawn mower 10 rotates the cutter blade 15 clockwise (in the direction indicated by an arrow R) by the motor 16 to cut (clip) the grass under the lawn mower 10. At this time, the lawn mower 10 generates flows of the air (swirl air flow or swirl wind) in the housing 12 swirling in the same direction as the cutter blade 15. By this swirl air flow, the grass cut by the cutter blade 15 can be delivered to and stored in a grass clippings container 20 through a grass clippings discharge passage 13 formed in the housing 12. Hereinafter, the grass cut (clipped) by the cutter blade 15 will also be referred to as the "clippings". Further, the "swirl air flow" will also be referred to as the "transportation wind".

In FIG. 1, the housing 12 is a casing having an opened bottom where only the surface facing the ground Gr (lawn) under the housing 12 is open. This housing 12 is in the form of a spiral casing. The housing 12 has a scroll section 12a (see FIG. 2) that has a spiral shape in a plan view, swirls the grass cut by the cutter blade 15 by the swirl wind, and transports the grass toward the grass clippings discharge passage 13. The scroll section 12a is a blade accommodation chamber (transportation wind generation chamber) formed in the housing 12.

As shown in FIG. 2, a mode switch damper 19 is provided for the grass clippings discharge passage 13. The mode switch damper 19 can be operated by a control lever (not shown). By controlling the open/closed state of the mode switch damper 19, it is possible to selectively switch the operating mode between a bugging mode for storing the grass clippings in the grass clippings container 20 and a mulching mode for discharging the clippings below the housing 12.

Figure 4:
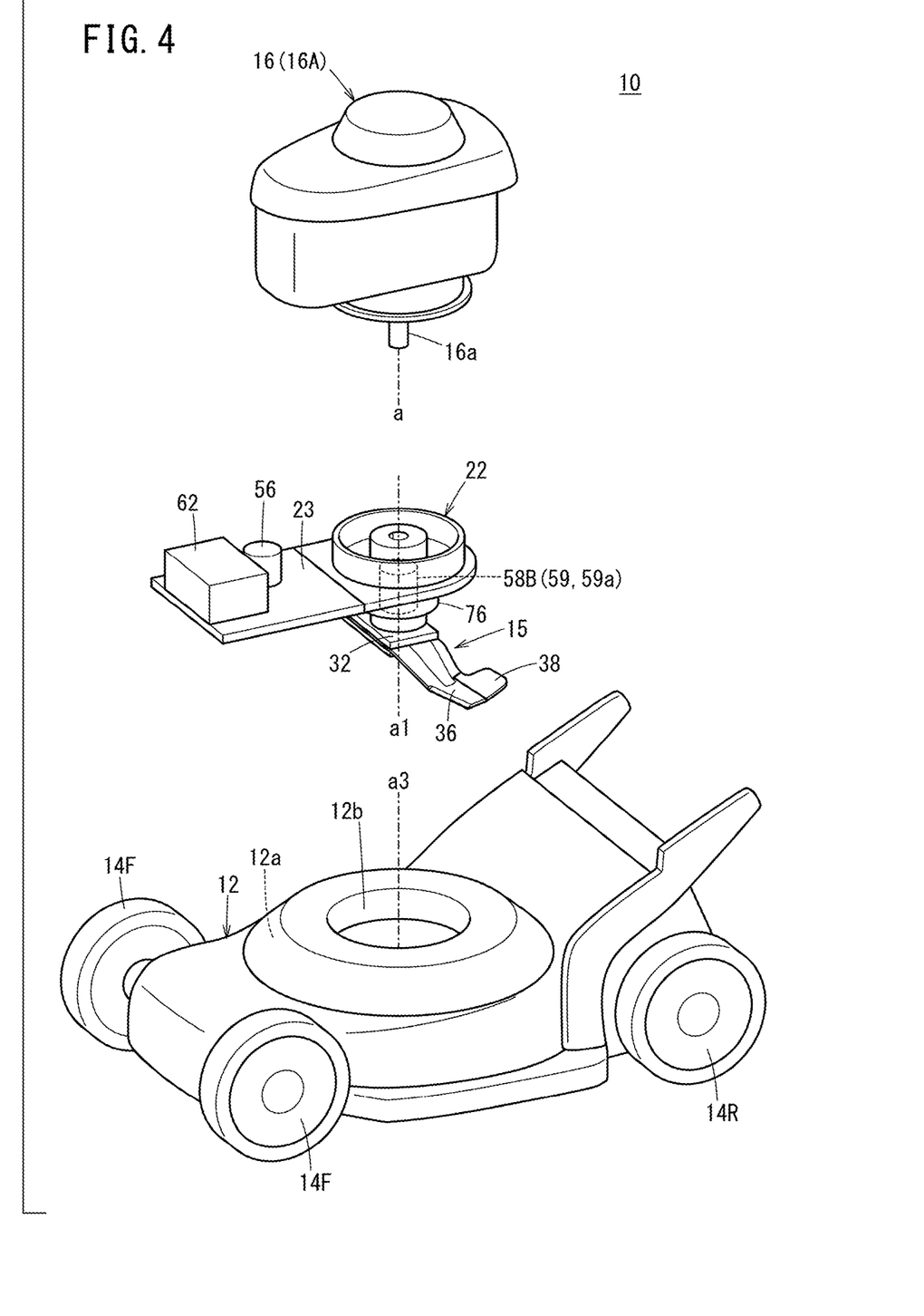
FIG. 4 is an exploded perspective view showing the lawn mower.

In FIG. 4, a central opening 12b is formed in a central part of the housing 12, surrounding the scroll section 12a. Rotational driving power generated by the motor 16 is transmitted to the cutter blade 15 through the central opening 12b. In FIG. 4, the control handle 18 and the grass clippings container 20 are not shown.

A motor base 22 is attached to an upper surface of the housing 12 in a manner that the motor base 22 covers the central opening 12b. The motor 16 is attached to an upper surface of the motor base 22. A support plate 23 is fixed to a front end of the motor base 22. A battery 62 and a flap drive source 56 described later are attached to the support plate 23.

In the present embodiment, an engine 16A is mounted as the motor 16. It should be noted that the motor 16 is not limited to the engine 16A. For example, the motor 16 may be an electric motor. The motor 16 has an output axis 16a that protrudes downward and extends into the housing 12. In the present embodiment, since the motor 16 is the engine 16A, the output axis 16a of the engine 16A is a crankshaft.

In FIG. 1, the output axis 16a is substantially vertical to the ground Gr. Therefore, in the case where the lawn mower 10 is present on a horizontal ground Gr, the output axis 16a is rotated about the rotation core which is substantially perpendicular to the horizontal plane.

The driving power generated by the motor 16 is transmitted to the left and right rear wheels 14R as traveling driving power through a traveling power transmission mechanism 24 and a transmission 25 coupled to the output axis 16a. Therefore, the left and right rear wheels 14R are configured as drive wheels. In the present embodiment, the traveling power transmission mechanism 24 is in the form of a belt mechanism 24A. The belt mechanism 24A includes a drive pulley 26 fixed to the output axis 16a, a driven pulley 28 coupled to the transmission 25, and a drive belt 30 wound around the drive pulley 26 and the driven pulley 28. As the transmission 25, for example, a hydraulic continuously variable transmission may be used.

The cutter blade 15 is coupled to the output axis 16a of the motor 16. The rotational driving power is transmitted from the output axis 16a to the cutter blade 15 and thus the cutter blade 15 rotates. Specifically, the cutter blade 15 is coupled to the output axis 16a through a blade holder 32 (see also FIG. 5). The blade holder 32 is attached to a central part of the cutter blade 15 and coupled to a lower end of the output axis 16a coaxially with the output axis 16a. Therefore, in the present embodiment, the rotation axis a1 (central line of rotation) of the cutter blade 15 is in alignment with the rotation core a of the output axis 16a (the rotation axis a1 of the cutter blade 15 is coaxial with the rotation core a of the output axis 16a). Hereinafter, the rotation axis a1 of the cutter blade 15 will be referred to as the "blade rotation axis a1". The blade rotation axis a1 is coaxial with the central line a3 (see FIG. 4) of the central opening 12b of the housing 12.

Figure 3:
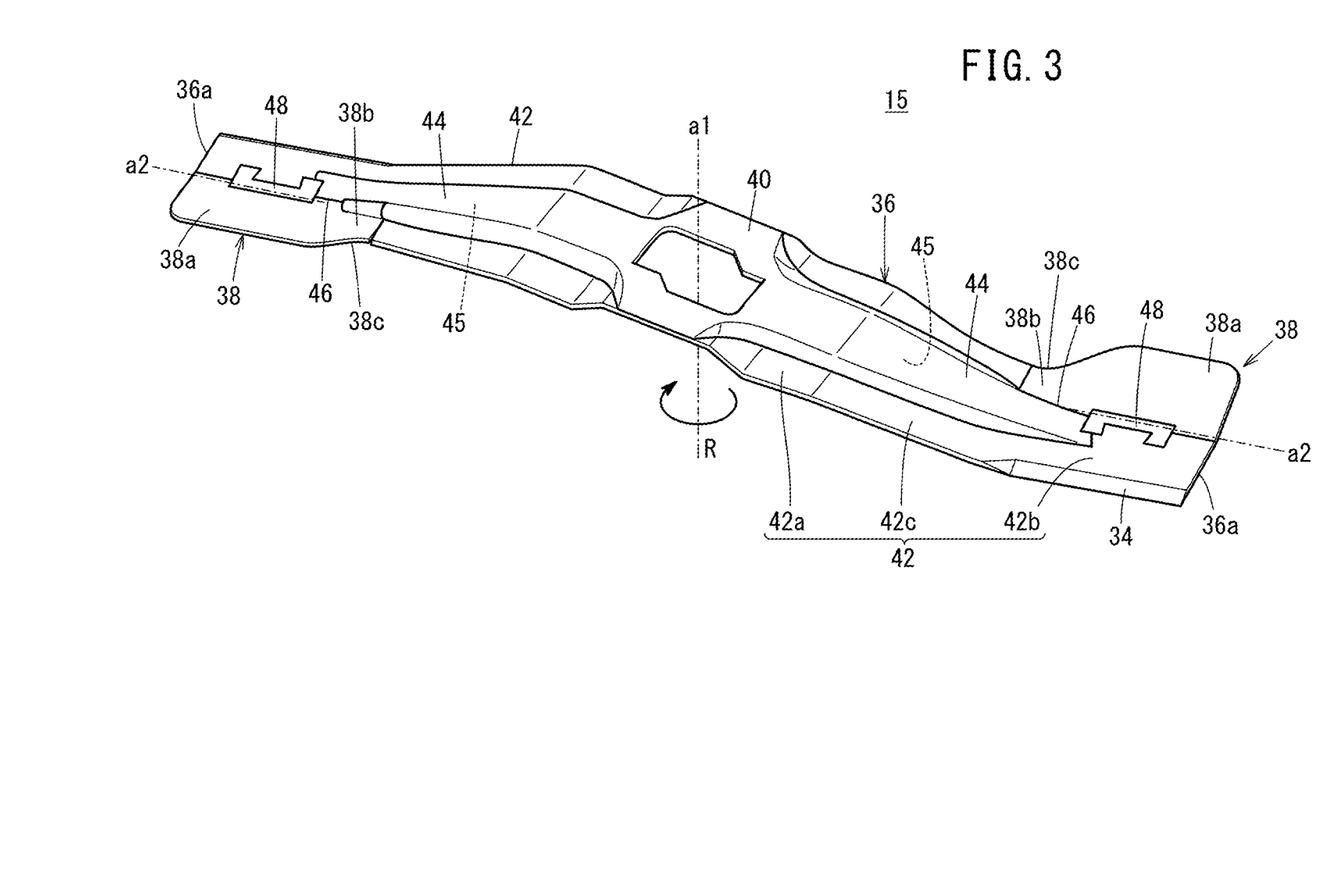
FIG. 3 is a perspective view showing a cutter blade mounted in the lawn mower.

As shown in FIG. 3, the cutter blade 15 includes a blade body 36 and flaps 38. The blade body 36 is provided with blade edges 34 that extend perpendicularly with respect to the blade rotation axis a1 and are provided at front edge portions of the cutter blade 15 in the direction of rotation. The flaps 38 are attached to the blade body 36 and flap angles θ (see FIG. 5) of the flaps 38 are changeable.

The blade body 36 is a long and narrow member in the form of a plate (so called bar blade). Hereinafter, the longitudinal direction of the cutter blade 15 (blade body 36) will also be referred to as the "radial direction". The blade body 36 includes a central proximal part 40 and a pair of blade arms 42 extending in the opposite directions from the central proximal part 40. The pair of the blade arms 42 is symmetrical with each other about the blade rotation axis a1.

Each of the blade arms 42 includes an inner blade forming part 42a forming a radially inner area of the blade arm 42, an outer blade forming part 42b (clipping part) forming a radially outer area of the blade arm 42, and an intermediate blade forming part 42c forming an area between the inner blade forming part 42a and the outer blade forming part 42b. The inner blade forming part 42a and the outer blade forming part 42b are perpendicular to the blade rotation axis a1. Therefore, the inner blade forming part 42a and the outer blade forming part 42b are parallel to each other.

In FIG. 3, the intermediate blade forming part 42c is inclined downward and radially outward. Therefore, the outer blade forming part 42b is positioned below the inner blade forming part 42a. Each of the blade arms 42 may have a constant height from the inner blade forming part 42a to the outer blade forming part 42b.

The blade body 36 has a shape with a sweepback angle that inclines in a reverse-rotation direction of the cutter blade 15 (anticlockwise in a plan view) with respect to the radiation direction about the blade rotation axis a1. That is, the blade body 36 (pair of blade arms 42) is curved toward the reverse-rotation direction of the cutter blade 15 (opposite to the direction indicated by an arrow R) at an intermediate position between the blade rotation axis a1 and an outer end 36a of the blade body 36. The blade body 36 may have a shape that does not include any sweepback angle (shape extending straight in the radial direction).

The blade edges 34 are formed along the front edges in the rotation direction at both ends of the blade body 36. Each of the blade edges 34 is formed in a straight line on a plane surface perpendicular to the blade rotation axis a1. In the present embodiment, the blade edge 34 is formed over the entire front edge of the outer blade forming part 42b. A radially inner end of the blade edge 34 is formed at the front edge where the outer blade forming part 42b and the intermediate blade forming part 42c are connected together.

An expansion 44 is provided for the blade body 36. The expansion 44 extends in the radial direction of the cutter blade 15. The expansion 44 is expanded in the thickness direction (vertical direction) of the cutter blade 15. In FIG. 3, the expansion 44 is expanded upward. The expansion 44 is provided at an intermediate portion (central portion) in the width direction of the blade body 36. The width direction of the blade body 36 herein means a direction perpendicular to the longitudinal direction and the thickness direction of the blade body 36.

The expansion 44 is formed over an area from the inner blade forming part 42a to the outer blade forming part 42b. More specifically, the expansion 44 extends from the inner end of the inner blade forming part 42a to the inner end of the outer blade forming part 42b (portion of the outer blade forming part 42b on the intermediate blade forming part 42c side). The width of the expansion 44 is decreased toward the outer end 36a of the blade body 36 (radially outward direction). A recess 45 as the back surface of the expansion 44 is formed in the surface of the blade body 36 (lower surface of the blade body 36 in the present embodiment) that is the back of the surface where the expansion 44 is provided.

Flap placement cutouts 46 are formed at the outer ends of the blade body 36. The flaps 38 are provided in the flap placement cutouts 46. The flap placement cutouts 46 are areas formed by cutting a portion off the rear edges at the outer ends of the blade body 36 (i.e., the back of the blade edges 34 in the width direction of the blade body 36), a cutting line extending toward the rotational direction of the blade. The flap placement cutouts 46 extend in the longitudinal direction of the cutter blade 15 in parallel to the blade edge 34.

In the present embodiment of the present invention, the flap placement cutout 46 is formed in each of the outer blade forming parts 42b in the pair of blade arms 42. The outer end of the flap placement cutout 46 reaches the outer end 36a of the blade body 36. The flap placement cutout 46 may be positioned at the intermediate position of each of the blade arms 42 in the radial direction. That is, the outer end of the flap placement cutout 46 may be positioned further radially inward than the outer end 36a of the blade body 36.

The flap 38 is a plate member pivotally supported by the blade body 36. A hinge 48 is provided for the outer blade forming part 42b. The hinge 48 protrudes toward the flap replacement cutout 46. A hinge pin (not shown) is inserted into the hinge 48, and the front edge of the flap 38 is fixed to the hinge pin.

In the structure, the flap 38 is pivotable about the pivotal axis a2 that extends through the center of the hinge pin. Hereinafter, the pivotal axis a2 will be referred to as the "flap pivotal axis a2". The flap pivotal axis a2 is provided on a plane perpendicular to the blade rotation axis a1. The flap 38 can be swung vertically by pivotal movement about the flap pivotal axis a2.

In the present embodiment, the flap 38 includes a wide part 38a having a relatively large width and a narrow part 38b having a relatively small width and being provided further radially inward than the wide part 38a is. Therefore, in the wide part 38a, the flap 38 has a shape protruding in the reverse-rotation direction of the cutter blade 15 (substantially L-shape in a plan view). The back edge 38c continuous from the wide part 38a to the narrow part 38b has a smoothly curved, recessed shape (arc shape). It should be noted that the flap 38 may have substantially a constant width in the radial direction of the cutter blade 15 (substantially a quadrangle in a plan view).

The flap pivotal axis a2 is provided along the blade edge 34. That is, the flap pivotal axis a2 is provided substantially in parallel to the blade edge 34. Further, as viewed from the direction along the blade rotation axis a1, the flap pivotal axis a2 does not intersect the blade rotation axis a1. The two flap pivotal axes a2 are in parallel to each other with the blade rotation axis a1 located therebetween. The flap rotation axis a2 is provided at a position placed toward the rotation direction of the cutter blade 15 away from a line perpendicular to the blade rotation axis a1 and in parallel with the flap pivotal axis a2. It should be noted that the flap pivotal axis a2 may intersect the blade rotation axis a1.

In FIG. 1, in order to drive the flaps 38 having the above structure, the lawn mower 10 further includes a flap drive mechanism 54.

Figure 5:
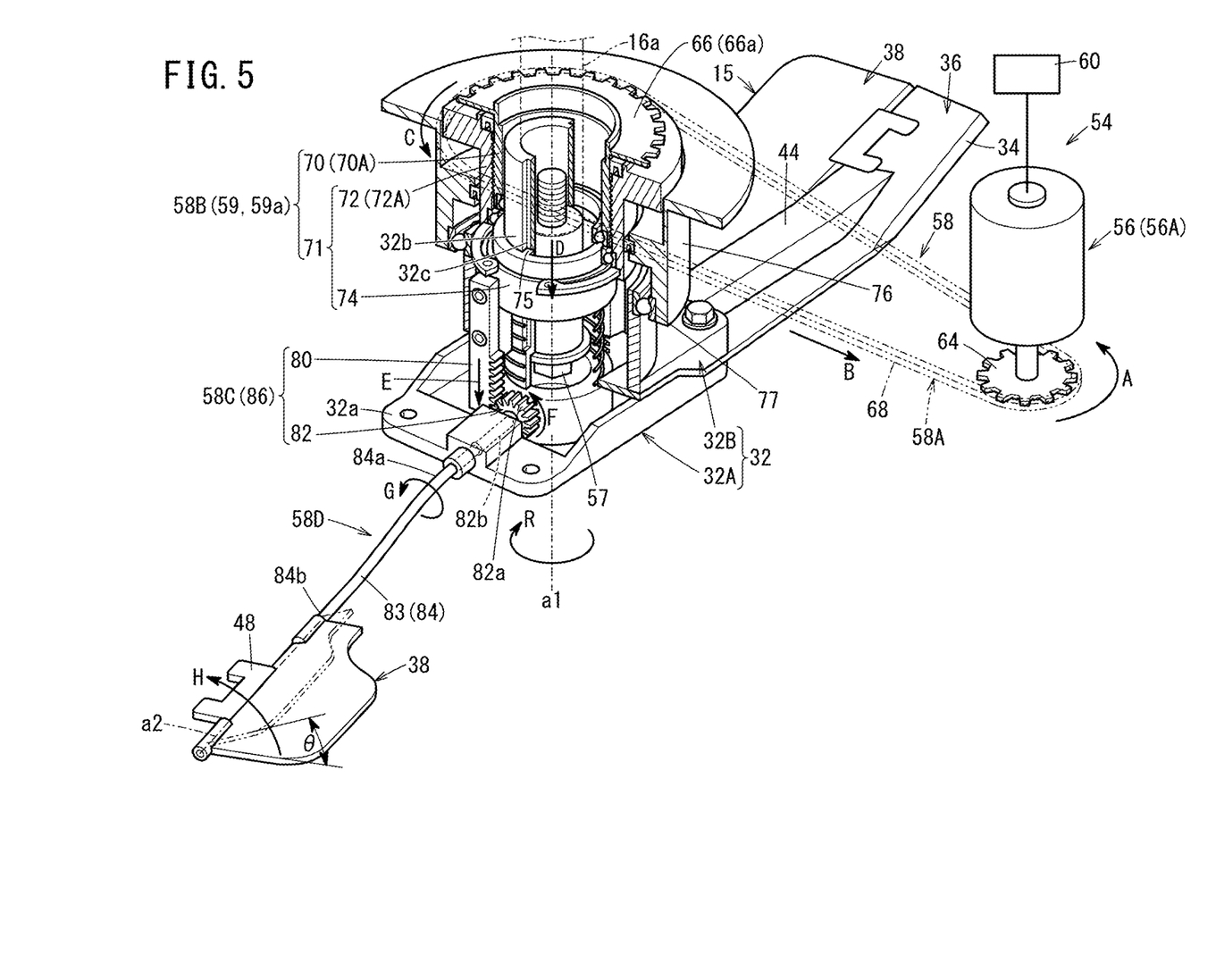
FIG. 5 is a view showing structure of the cutter blade and a flap drive mechanism.

In FIG. 5, the flap drive mechanism 54 includes a flap drive source 56, and a power transmission mechanism 58 for transmitting the driving power of the flap drive source 56 to the flaps 38. The output axis 16a is fixed to the blade holder 32 which holds the cutter blade 15. The blade holder 32 is provided coaxially with the blade rotation axis a1. Specifically, the blade holder 32 includes a first holder member 32A which contacts a lower surface of the blade body 36, and a second holder member 32B which contacts an upper surface of the blade body 36. The blade body 36 is held and fixed between the first holder member 32A and the second holder member 32B.

The first holder member 32A includes a holder base part 32a supporting a lower surface of the blade body 36, and a hollow support cylinder 32b protruding upward from a central portion of the holder base part 32a. The support cylinder 32b extends coaxially with the blade rotation axis a1. The output axis 16a is coupled to the support cylinder 32b by a bolt 57. Thus, during rotation of the output axis 16a, the blade holder 32 and the cutter blade 15 rotate together with the output axis 16a.

In the embodiment of the present invention, the flap drive source 56 is a rotary actuator. More specifically, the flap drive source 56 is a geared motor 56A. The flap drive source 56 is controlled by a control unit 60. The flap drive source 56 may be driven by, as a power source, the battery 62 (see FIG. 1) provided outside the housing 12. In FIG. 1, the battery 62 is provided on the front side of the housing 12 (further forward than the motor 16).

In FIG. 5, the power transmission mechanism 58 includes a first transmission mechanism section 58A coupled to the flap drive source 56, a second transmission mechanism section 58B for converting the moving direction of the driving power from the first transmission mechanism section 58A, a third transmission mechanism section 58C for converting the moving direction of the driving power from the second transmission mechanism section 58B, and a fourth transmission mechanism section 58D for transmitting the driving power from the third transmission mechanism section 58C to the flaps 38.

The first transmission mechanism section 58A transmits the rotational driving power (rotational movement) of the flap drive source 56 in the form of the rotational movement. Specifically, the first transmission mechanism section 58A includes a drive sprocket 64 fixed to the output axis of the flap drive source 56, a driven sprocket 66 positioned coaxially with the blade rotation axis a1 in a rotatable manner, and a chain 68 wound around the drive sprocket 64 and the driven sprocket 66.

The diameter of the driven sprocket 66 is larger than the diameter of the drive sprocket 64. The driven sprocket 66 is supported, with a bearing 65 interposed, by the support cylinder 32b provided for the blade holder 32. The driven sprocket 66 constitutes a driven rotating body 66a to which the rotational driving power is transmitted from the flap drive source 56 and which is rotatable about the blade rotation axis a1. The driven rotating body 66a is provided between the motor 16 and the housing 12.

The driven sprocket 66 has a ring shape and has an opening. The output axis 16a of the motor 16 is inserted into the opening of the driven sprocket 66. It should be noted that the first transmission mechanism section 58A may be a belt transmission mechanism having a pulley and a belt. The first transmission mechanism section 58A may be a gear mechanism for transmitting the driving power through a plurality of gears.

The second transmission mechanism section 58B is an intermediate power transmission unit 59 provided on a power transmission path between the flap drive source 56 and the flap 38 and coaxially with the blade rotation axis a1. As shown in FIG. 4, the output axis 16a of the motor 16 is provided coaxially with the blade rotation axis a1 and the intermediate power transmission unit 59.

Figure 6:
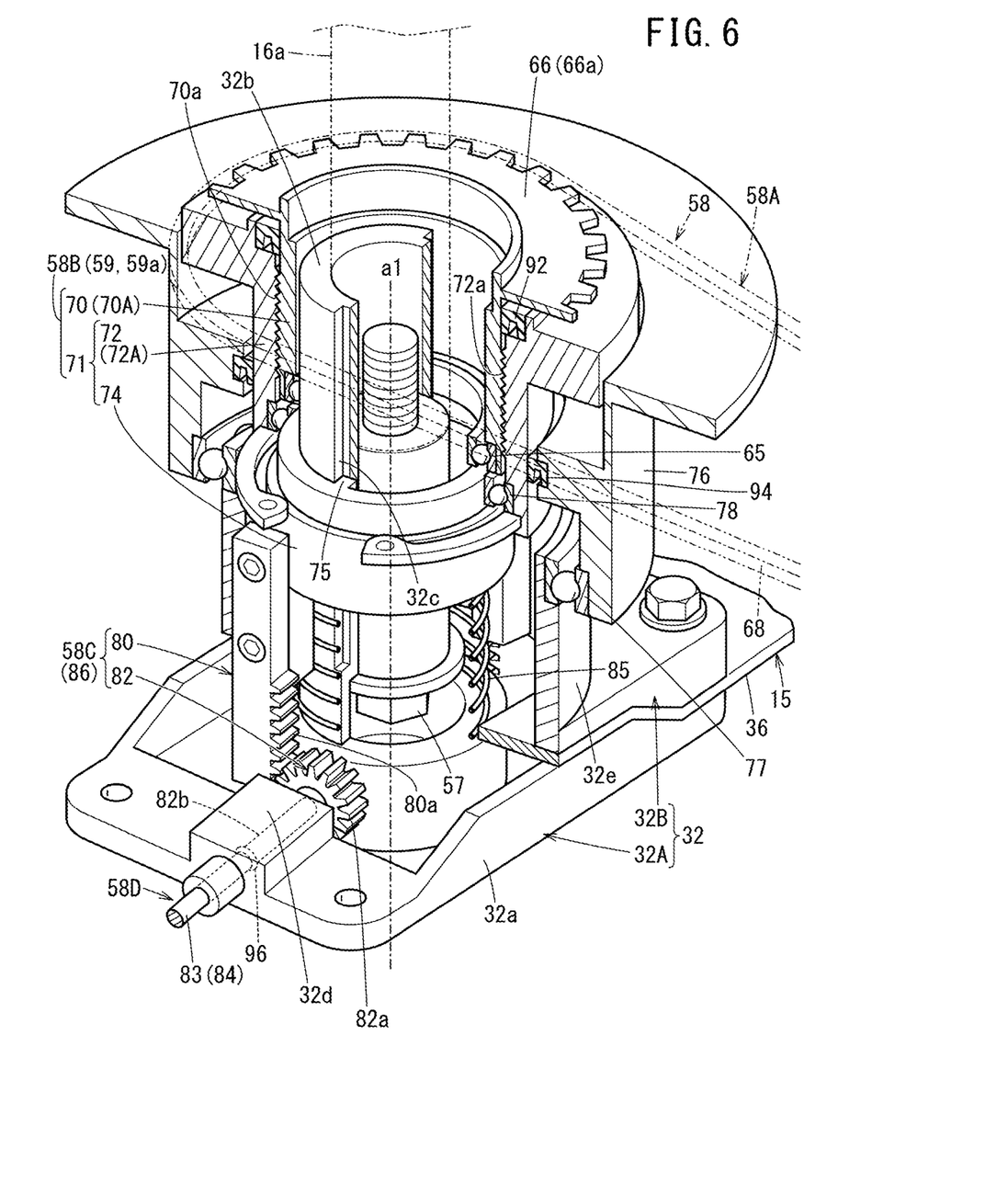
FIG. 6 is a view showing structure of a power steering unit and components around the power steering unit.

In FIG. 6, the intermediate power transmission unit 59 is a power steering unit 59a for converting rotation movement about the blade rotation axis a1 into movement in the axial direction along the blade rotation axis a1. The power steering unit 59a is a hollow cylindrical body having hollow part along the blade rotation axis a1. The rotational driving power of the motor 16 is transmitted to the cutter blade 15 through the hollow part of the power steering unit 59*a*.

The second transmission mechanism section 58B includes a first screw cylinder 70, a second screw cylinder 72, and a slide cylinder 74. A male screw 70*a* is formed in the outer circumferential surface of the first screw cylinder 70. A female screw 72*a* configured to be screw-engaged with the male screw 70*a* is formed in the inner circumferential surface of the second screw cylinder 72. The slide cylinder 74 is rotatable relative to the second screw cylinder 72 and displaceable along the blade rotation axis a1.

The first screw cylinder 70 is formed coaxially with the driven sprocket 66. The first screw cylinder 70 has a hollow cylindrical shape protruding downward from the driven sprocket 66. The first screw cylinder 70 constitutes a rotation cylinder 70A. Driving power from the flap drive source 56 is transmitted to the rotation cylinder 70A. The rotation cylinder 70A is rotatable about the blade rotation axis a1.

During rotation of the driven sprocket 66, the first screw cylinder 70 rotates together with the driven sprocket 66. The first screw cylinder 70 is formed integrally with the driven sprocket 66. That is, the driven sprocket 66 and the first screw cylinder 70 are a single component part. It should be noted that the first screw cylinder 70 may be a separate component part fixed to the driven sprocket 66. The bearing 65 is supported by the inner circumferential portion of the first screw cylinder 70.

For example, the second screw cylinder 72 is slidable along the blade rotation axis a1 due to a spline structure and supported by a unit holder 76 in a non-rotatable manner about the blade rotation axis a1. The second screw cylinder 72 is accommodated inside the unit holder 76 in a vertically movable manner. The second screw cylinder 72 is screwed-engaged with the rotation cylinder 70A and includes a screw cylinder 72A which is provided in a non-rotatable manner with respect to the machine body (housing 12) of the lawn mower 10.

The unit holder 76 is a hollow cylindrical member fixed to the housing 12 in a non-rotatable manner and surrounds the second screw cylinder 72. A bearing 77 is provided between the unit holder 76 and the blade holder 32 (cylindrical portion 32*e* of the second holder member 32B). In this manner, the blade holder 32 is supported in a rotatable manner about the blade rotation axis a1. As shown in FIG. 4, the unit holder 76 is fixed to the lower position of the motor base 22. Therefore, the unit holder 76 is fixed to the housing 12 with the motor base 22 interposed.

In FIG. 6, the slide cylinder 74 is supported by the support cylinder 32*b* provided in the blade holder 32, slidably along the blade rotation axis a1, and supported in a relatively non-rotatable manner about the blade rotation axis a1. Therefore, when the blade holder 32 rotates together with the cutter blade 15, the slide cylinder 74 rotates together with the support cylinder 32*b* about the blade rotation axis a1. The second screw cylinder 72 and the slide cylinder 74 constitute an axially movable body 71 engaged with the rotation cylinder 70A in a displaceable manner along the rotation axis a1 as a result of rotation of the rotation cylinder 70A (first screw cylinder 70).

A guide groove 32*c* is formed along the blade rotation axis a1 in the outer circumferential surface of the support cylinder 32*b*. A projection 75 is formed on the inner circumferential surface of the slide cylinder 74 and is inserted into the guide groove 32*c*. In the structure, though the slide cylinder 74 is slidable along the blade rotation axis a1 relative to the support cylinder 32*b*, the slide cylinder 74 is not rotatable relative to the support cylinder 32*b*. A bearing 78 is provided between the second screw cylinder 72 and the slide cylinder 74. In the structure, the slide cylinder 74 is rotatably supported by the second screw cylinder 72 with the bearing 78 interposed.

The slide cylinder 74 is elastically biased toward the second screw cylinder 72 by a compression coil spring 85 all the time. The compression coil spring 85 is provided between the slide cylinder 74 and the first holder member 32A (holder base part 32*a*). Thus, when the second screw cylinder 72 moves downward, the slide cylinder 74 is pressed downward by the second screw cylinder 72. As a result, the slide cylinder 74 is lowered against the elastic force of the compression coil spring 85. In contrast, when the second screw cylinder 72 moves upward, the slide cylinder 74 moves upward together with the second screw cylinder 72 by the elastic force of the compression coil spring 85. Therefore, when the second screw cylinder 72 is displaced along the rotation axis a1, the slide cylinder 74 is displaced (moves vertically) in the axial direction together with the second screw cylinder 72.

In FIG. 5, the third transmission mechanism section 58C is a rack and pinion mechanism 86 which converts the movement in the axial direction along the blade rotation axis a1 into a rotational movement to rotate the flaps 38. In FIG. 6, the third transmission mechanism section 58C includes a rack member 80 fixed to the slide cylinder 74, and a pinion member 82 provided with a pinion 82*a* in mesh with teeth 80*a* of the rack member 80. A pair of the rack members 80 and a pair of the pinion members 82 are provided symmetrically about the blade rotation axis a1.

The rack member 80 is a rod member extending along the blade rotation axis a1. The teeth 80*a* are formed in the rack member 80 along the blade rotation axis a1. When the slide cylinder 74 is displaced along the rotation axis a1, the rack member 80 is displaced in the axial direction (moves vertically) together with the slide cylinder 74. An axial part 82*b* of the pinion member 82 is rotatably supported by a pinion support 32*d* provided at each of both ends of the holder base part 32*a* of the blade holder 32.

In FIG. 5, the fourth transmission mechanism section 58D is a drive shaft 83 which transmits the rotational driving power for operating the flaps 38, to the flaps 38. In the embodiment of the present invention, the drive shaft 83 is a flexible shaft 84. The flexible shaft 84 is configured to transmit the rotation power inputted to one end 84*a* to the other end 84*b* which is positioned non-coaxially with the one end 84*a*. For example, the flexible shaft 84 has structure obtained by combining steel wires that are wound reversely to each other.

One end 84*a* of the flexible shaft 84 is coupled and fixed to the axial part 82*b* of the pinion member 82. The other end 84*b* of the flexible shaft 84 is coupled and fixed to the flap 38. Specifically, the other end 84*b* of the flexible shaft 84 is coupled and fixed to the radially inner end of the flap 38 on the flap pivotal axis a2. The other end 84*b* of the flexible shaft 84 is positioned below the one end 84*a* of the flexible shaft 84. The flexible shaft 84 is provided inside the recess 45 of the blade body 36 (see FIG. 3).

It should be noted that in the case where the blade body 36 has a shape that does not include any sweepback angle, and the height of the blade body 36 does not change from the inner blade forming part 42*a* to the outer blade forming part 42*b*, the drive shaft 83 may be a hard (non-flexible) and straight shaft.

In FIG. 6, an annular seal member 92 made of elastic material is provided between the outer circumferential portion of the first screw cylinder 70 and the outer circumferential portion of the second screw cylinder 72. An annular seal member 94 made of elastic material is provided between the outer circumferential portion of the second screw cylinder 72 and the inner circumferential portion of the unit holder 76. An annular seal member 96 made of elastic member is provided between the axial part 82b of the pinion member 82 and the inner circumferential surface of the pinion support 32d. By the annular seal member 92, entry of water and foreign matter such as dust into the screw engagement part (the male screw 70a and the female screw 72a) between the first screw cylinder 70 and the second screw cylinder 72 is prevented. Further, by the annular seal members 92, 94, 96, entry of the foreign matter into the power steering unit 59a and the blade holder 32 is prevented.

Next, operation of the lawn mower 10 having the above structure will be described.

In FIG. 1, when the cutter blade 15 is rotated under operation of the motor 16, the cutter blade 15 cuts (clips) grass grown on the lawn ground right under the lawn mower 10. The clipped grass (grass clippings) is swirled by the transportation wind (swirl wind) produced by rotation of the cutter blade 15 and transported to the grass clippings container 20 through the grass clippings discharge passage 13 formed in the housing 12.

In this case, the flaps 38 provided for the cutter blade 15 are operated by the flap drive mechanism 54 roughly in the following manner.

In FIG. 5, when the output axis of the flap drive source 56 is rotated, rotation of the output axis 16a is transmitted to the driven sprocket 66 through the chain 68. When the driven sprocket 66 is rotated, the slide cylinder 74 is displaced in the axial direction together with the second screw cylinder 72 which is in screw engagement with the first screw cylinder 70. When the slide cylinder 74 is displaced in the axial direction, the rack member 80 is displaced in the same direction as the slide cylinder 74, and the pinion member 82 is rotated. When the pinion member 82 is rotated, the flexible shaft 84 is rotated, and the flap angle $\theta$ of the flap 38 changes.

In FIG. 5, the flaps 38 are placed in a horizontal state (flap angle $\theta=0°$). As an example of the flap drive mechanism 54, operation of increasing the flap angle $\theta$ (swinging the flap 38 upward) will be described.

When the output axis of the flap drive source 56 is rotated in the direction indicated by the arrow A, in the first transmission mechanism section 58A, the rotational driving power of the flap drive source 56 is transmitted to a member provided coaxially with the blade rotation axis a1. Specifically, by rotation of the output axis of the flap drive source 56 in the direction indicated by the arrow A, the chain 68 wound around the drive sprocket 64 moves in the direction indicated by the arrow B. As a result of movement of the chain 68, the driven sprocket 66 wound around the chain 68 rotates in the direction indicated by an arrow C.

As a result of rotation of the driven sprocket 66, by the second transmission mechanism section 58B, the rotational driving power is converted into the driving power in the axial direction. Specifically, when the first screw cylinder 70 provided for the driven sprocket 66 is rotated in the direction indicated by the arrow C, by screw engagement of the male screw 70a and the female screw 72a, the second screw cylinder 72 moves down as indicated by an arrow D. That is, though rotation of the second screw cylinder 72 is limited by the unit holder 76, since the second screw cylinder 72 can move in the vertical direction (in the direction along the blade rotation axis a1), the rotational movement of the first screw cylinder 70 is converted into the linear movement by the male screw 70a and the female screw 72a, and the linear movement is transmitted to the second screw cylinder 72.

Then, when the second screw cylinder 72 is lowered, the slide cylinder 74 is lowered as well. In this case, the slide cylinder 74 is rotatable relative to the second screw cylinder 72. Therefore, the slide cylinder 74 rotates together with the support cylinder 32b of the blade holder 32 about the blade rotation axis a1 in the direction indicated by the arrow R.

As a result of the downward movement of the slide cylinder 74, the axial driving power is converted into the rotational driving power by the third transmission mechanism section 58C. Specifically, when the rack member 80 fixed to the slide cylinder 74 is lowered as indicated by an arrow E, the pinion member 82 in mesh with the rack member 80 is rotated in a direction indicated by an arrow F.

As a result of rotation of the pinion member 82, the rotational driving power is transmitted to the flap 38 by the fourth transmission mechanism section 58D. Specifically, the flexible shaft 84 coupled to the pinion member 82 is rotated in the direction indicated by an arrow G, whereby rotation of the pinion member 82 is transmitted to the flap 38. The flap 38 is rotated about the flap pivotal axis a2 in the direction indicated by an arrow H. As a result, as denoted by an imaginary line in FIG. 5, the flaps 38 swings upward.

The magnitude of the flap angle $\theta$ corresponds to the amount of downward displacement of the second screw cylinder 72 from the initial position of the second screw cylinder 72 (position of the second screw cylinder 72 when the flap angle $\theta=0°$) which moves in the axial direction as a result of rotation of the first screw cylinder 70. When the cutter blade 15 is rotated in the state where the flap angle $\theta$ is larger than 0°, the flap 38 produces an upward air flow.

The flap angle $\theta$ of the flap 38 is controlled by the control unit 60, e.g., according to the operating condition of the lawn mower 10. In this case, the flap angle $\theta$ is detected by a flap angle detection sensor (not shown), and the control unit 60 receives the detected flap angle $\theta$ as a feedback signal to control the flap drive source 56. For example, the flap angle detection sensor may detect the position of the second screw cylinder 72, the slide cylinder 74, or the rack member 80, and the control unit 60 may indirectly detect the flap angle $\theta$ based on the detected position. The flap angle detection sensor may detect the position of the pinion member 82, the flexible shaft 84, or the flap 38 itself in the rotation direction. The flap angle detection sensor may be a rotary encoder provided for the flap drive source 56.

For example, the control unit 60 may control the flap drive source 56 in a manner that the flap angle $\theta$ is increased in proportion to the increase in the lawn mowing load. Alternatively, the control unit 60 may control the flap drive source 56 in a manner to adjust the flap angle $\theta$ of the motor 16 based on parameters (weight, weight change amount, internal pressure changes, etc.) regarding the grass clippings container 20 (FIG. 1). Alternatively, the control unit 60 may control the flap drive source 56 in a manner to adjust the flap angle $\theta$ according to the types of the operation modes (bagging mode, mulching mode) of the lawn mower 10.

In this case, the lawn mower 10 according to the present embodiment offers the following advantages.

The lawn mower 10 includes the cutter blade 15 having the changeable flap angle $\theta$ of the flaps 38 and the flap drive mechanism 54 for driving the flaps 38. Therefore, the flap angle $\theta$ of the flaps 38 can be determined to have an optimum angle in accordance with the operating condition of the lawn mower 10. Accordingly, in accordance with the operating condition of the lawn mowing operation, it is possible to efficiently produce the transportation wind by the flaps 38.

That is, by inclining the flaps 38 upward, the grass growing on the lawn ground is oriented to stand upright by the upward air flow and it is possible to cut (clip) the grass by the cutter blade 15 efficiently. Further, after the grass (grass clippings) cut by the cutter blade 15 is lifted upward and swirled in the housing 12 by the transportation wind, i.e., the upward air flow and the swirl air flow generated by the flaps 38, the grass can be transported into the grass clippings container 20 efficiently.

In the structure, it is possible to efficiently swirl the grass clippings by the transportation wind in the housing 12 and transport the grass clippings to the grass clippings container 20 (FIG. 1) efficiently. Further, when the load is small, e.g., when the cutter blade 15 is in the idling state and no lawn mowing operation is performed, it is possible to reduce the noises such as wind noises by reducing the flap angle θ of the flaps 38.

In the lawn mower 10, the motor 16 which tends to have a heavy weight is provided coaxially with the blade rotation axis a1 and the intermediate power transmission unit 59 which is part of the flap drive mechanism 54. In the lawn mower 10 having the cutter blade 15 equipped with the flap 38, it is possible to achieve the suitable balance of weight distribution. That is, it is possible to bring the center of gravity of the lawn mower 10 closer to the blade rotation axis a1. Accordingly, it becomes possible to provide the flap mechanism in the cutter blade 15 without losing the suitable balance of weight distribution.

In this manner, it becomes possible to improve the performance of handling the lawn mower 10. In the case of changing the direction of the lawn mower 10, since the load of depressing the handle is not increased, it becomes possible to decrease the burden on the user. Further, during the working operation in the slope area (uphill slope), it becomes possible to suppress a possibility of the front wheels 14F floating above the road.

The intermediate power transmission unit 59 is a power steering unit 59a for converting the rotational driving power from the flap drive source 56 into the axial power along the blade rotation axis a1. In the structure, it is possible to adopt a rotary actuator (geared motor 56A, etc.) as the flap drive source 56. The flap angle θ can be adjusted with a high degree of accuracy by adopting the rotary actuator.

The power steering unit 59a is a hollow cylindrical body having a hollow part along the blade rotation axis a1. The rotational driving power of the motor 16 is transmitted to the cutter blade 15 through the hollow part of the power steering unit 59a. Accordingly, it is possible to provide a structure where the output axis 16a of the motor 16 and the power steering unit 59a are arranged coaxially, and the driving power for rotating the cutter blade 15 and the driving power for operating the flaps 38 are transmitted separately and suitably.

The power steering unit 59a includes the rotation cylinder 70A and the axially movable body 71. The driving power from the flap drive source 56 is transmitted to the rotation cylinder 70A. The rotation cylinder 70A is provided rotatably about the blade rotation axis a1. The axially movable body 71 is engaged with the rotation cylinder 70A in a manner that the axially movable body 71 is displaceable along the blade rotation axis a1 with the rotation of the rotation cylinder 70A. In the structure, it is possible to suitably convert the rotational driving power from the flap drive source 56 into the axial power along the blade rotation axis a1.

The axially movable body 71 includes the screw cylinder 72A and the slide cylinder 74. The screw cylinder 72A is screwed with the rotation cylinder 70A in a non-rotatable manner with respect to the housing 12 which is the machine body of the lawn mower 10. The slide cylinder 74 is provided rotatably with respect to the screw cylinder 72A and displaced together with the screw cylinder 72A by the displacement of the screw cylinder 72A along the rotation axis a1. In the structure, the slide cylinder 74 is rotatable together with the output axis 16a of the motor 16 and the cutter blade 15, and the flap driving power can suitably be transmitted to the flaps 38 provided in the rotating cutter blade 15.

The unit holder 76 is provided coaxially with the blade rotation axis a1, surrounding the screw cylinder 72A. Further, the blade holder 32 is provided coaxially with the blade rotation axis a1 and supported in a rotatable manner by the unit holder 76. In this manner, since the unit holder 76 has both of the function of supporting the screw cylinder 72A in a displaceable manner in the axial direction and the function of supporting the blade holder 32 in a rotatable manner, it is possible to simplify the structure.

The blade holder 32 includes the support cylinder 32b extending coaxially with the blade rotation axis a1. Further, the slide cylinder 74 is supported by the support cylinder 32b in a relatively non-rotatable and relatively axially movable manner. Accordingly, since the unit holder 76 has both of the function of supporting the slide cylinder 74 in a displaceable manner in the axial direction and the function of supporting the blade holder 32 in a rotatable manner, it becomes possible to simplify the structure.

The blade holder 32 includes the support cylinder 32b extending coaxially with the blade rotation axis a1 and the rotation cylinder 70A is supported in a rotatable manner by the support cylinder 32b. Accordingly, the unit holder 76 has both of the function of supporting the rotation cylinder 70A in a rotatable manner and the function of supporting the blade holder 32 in a rotatable manner, it becomes possible to simplify the structure.

The intermediate power transmission unit 59 is supported by the unit holder 76 attached to the housing 12 of the machine body of the lawn mower 10. In the structure, it is possible to suitably hold the intermediate power transmission unit 59.

The intermediate power transmission unit 59 includes the driven rotating body 66a. The rotational driving power from the flap drive source 56 is transmitted to the driven rotating body 66a, and the driven rotating body 66a is provided rotatably about the blade rotation axis a1. The driven rotating body 66a is provided between the motor 16 and the housing 12. In the structure, the driven rotating body 66a is provided outside the housing 12. Therefore, it is possible to avoid the situation where the blade accommodation chamber (transportation wind generation chamber) formed in the housing 12 is restricted by the driven rotating body 66a.

The intermediate power transmission unit 59 includes the axially movable body 71 which is displaceable along the blade rotation axis a1. Further, the flap drive mechanism 54 includes the rack and pinion mechanism 86 for converting the axial driving power of the axially movable body 71 into the rotational driving power for driving the flaps 38. In the structure, the force of holding the position (angle) is exerted stably over the movable range of the flaps 38, and only the minimum rattling occurs on the power transmission path between the axially movable body 71 and the flaps 38. Therefore, it is possible to generate the stable transportation wind without causing any bad influence on the lawn mowing performance.

The control handle 18 and the battery 62 for supplying electrical energy to the flap drive mechanism 54 are provided. The control handle 18 extends backward from the machine body (housing 12) equipped with the motor 16. Further, the battery 62 is provided further forward than the motor 16. In the structure, since the weight of the control handle 18 and the weight of the battery 62 are offset, the center of gravity of the lawn mower 10 can be positioned closer to the blade rotation axis a1. In this manner, it is possible to improve the balance of the weight distribution.

The expansion 44 is provided for the blade body 36 in an area extending over the cutter blade 15 in the radial direction and is expanded in the thickness direction of the cutter blade 15. In the surface (lower surface in the present embodiment) of the blade body 36 opposite to the surface where the expansion 44 is provided, the recess 45 forming the back surface of the expansion 44 is provided. Further, the flexible shaft 84 is provided in the recess 45 (FIG. 3).

In the structure, since the expansion 44 is provided, it is possible to improve the rigidity of the blade body 36, and since the flexible shaft 84 is provided in the recess 45, it becomes possible to reduce the air resistance during rotation of the cutter blade 15. Since the rigidity of the blade body 36 is improved and thus the variation in the height of the blade edge 34 during the rotation is reduced, it is possible to improve the appearance after the grass has been clipped. Since the air resistance during rotation of the cutter blade 15 is reduced, it is possible to reduce the roar such as wind noises.

The present invention is not limited to the above described embodiment. Various modifications can be made without deviating from the gist of the present invention.

The invention claimed is:

1. A lawn mower comprising:
   a motor having an output axis;
   a cutter blade that is rotatably driven by the motor and includes
      a blade body that is rotatable about a blade rotation axis and
      a flap that has a changeable flap angle and is attached to the blade body, and
   a flap drive mechanism configured to drive the flap, wherein
   the flap drive mechanism comprises:
      a flap drive source that generates power for driving the flap; and
      an intermediate power transmission unit provided on a power transmission path between the flap drive source and the flap and provided coaxially with the blade rotation axis,
   the output axis of the motor is provided coaxially with the blade rotation axis and the intermediate power transmission unit.

2. The lawn mower according to claim 1, wherein the intermediate power transmission unit is a power steering unit that converts rotational driving power from the flap drive source into axial power along the blade rotation axis.

3. The lawn mower according to claim 2, wherein the power steering unit comprises a hollow cylindrical body including a hollow part along the blade rotation axis; and
   the rotational driving power of the motor is transmitted to the cutter blade through the hollow part of the power steering unit.

4. The lawn mower according to claim 3, wherein the power steering unit comprises:
   rotation cylinder to which driving power from the flap drive source is transmitted and which is provided in a rotatable manner about the blade rotation axis; and
   an axially movable body that engages with the rotation cylinder in a displaceable manner along the blade rotation axis accompanied by rotation of the rotation cylinder.

5. The lawn mower according to claim 4, wherein the axially movable body comprises
   a screw cylinder that screw-engages with the rotation cylinder and is arranged in a non-rotatable manner with respect to a machine body of the lawn mower; and
   a slide cylinder that is arranged in a rotatable manner with respect to the screw cylinder and is displaced together with the screw cylinder accompanied by displacement of the screw cylinder along the blade rotation axis.

6. The lawn mower according to claim 5,
   wherein a unit holder that supports the screw cylinder in a displaceable manner along the blade rotation axis and in a relatively non-rotatable manner is provided coaxially with the blade rotation axis and surrounds the screw cylinder;
   a blade holder that holds the cutter blade is provided coaxially with the blade rotation axis; and
   the blade holder is supported in a rotatable manner by the unit holder.

7. The lawn mower according to claim 5, wherein a blade holder that holds the cutter blade is provided coaxially with the blade rotation axis;
   the blade holder includes a support cylinder extending coaxially with the blade rotation axis; and
   the slide cylinder is supported by the support cylinder in a relatively non-rotatable and relatively axially movable manner.

8. The lawn mower according to claim 5, wherein a blade holder that holds the cutter blade is provided coaxially with the blade rotation axis;
   the blade holder includes a support cylinder extending coaxially with the blade rotation axis; and
   the rotation cylinder is supported by the support cylinder in a rotatable manner.

9. The lawn mower according to claim 1, wherein the intermediate power transmission unit is supported by a unit holder attached to a machine body of the lawn mower.

10. The lawn mower according to claim 1, comprising a housing opened downward and containing the cutter blade, wherein the intermediate power transmission unit includes a driven rotating body to which rotational driving power from the flap drive source is transmitted and which is rotatable about the blade rotation axis; and
    the driven rotating body is provided between the motor and the housing.

11. The lawn mower according to claim 1, wherein the intermediate power transmission unit includes an axially movable body that is displaceable long the blade rotation axis; and
    the flap drive mechanism includes a rack and pinion mechanism that converts an axial driving power of the axially movable body into a rotational driving power for operating the flap.

12. The lawn mower according to claim 1, comprising a control handle that extends backward from a machine body equipped with the motor and a battery that supplies electric power to the flap drive mechanism,
wherein the battery is provided further forward than the motor.

* * * * *